(12) United States Patent
Weinberger

(10) Patent No.: US 6,552,888 B2
(45) Date of Patent: Apr. 22, 2003

(54) SAFETY ELECTRICAL OUTLET WITH LOGIC CONTROL CIRCUIT

(76) Inventor: Pedro J. Weinberger, 14 Horatio St., #3H, New York, NY (US) 10014

( * ) Notice: Subject to any disclaimer, the term of this patent is extended or adjusted under 35 U.S.C. 154(b) by 19 days.

(21) Appl. No.: 09/767,067

(22) Filed: Jan. 22, 2001

(65) Prior Publication Data

US 2002/0097546 A1 Jul. 25, 2002

(51) Int. Cl.[7] .................................................. H02H 9/00
(52) U.S. Cl. ........................ 361/57; 361/103; 307/125
(58) Field of Search .................... 361/42–50, 55–59, 361/62, 103, 106; 307/326, 117, 125, 126

(56) References Cited

U.S. PATENT DOCUMENTS

| 4,310,837 | A | * | 1/1982 | Kornrumpf et al. ........ 340/598 |
| 4,378,579 | A | | 3/1983 | Hudson, Jr. .................. 361/45 |
| 4,970,349 | A | | 11/1990 | Jones ........................... 174/67 |
| 4,995,017 | A | | 2/1991 | Sellati et al. ................. 307/86 |
| 5,095,182 | A | | 3/1992 | Thompson ............... 200/51.09 |
| 5,590,010 | A | * | 12/1996 | Ceola et al. .................. 337/13 |
| 5,600,306 | A | * | 2/1997 | Ichikawa et al. ............... 337/1 |
| 5,708,551 | A | * | 1/1998 | Bosatelli ...................... 307/38 |
| 5,715,125 | A | | 2/1998 | Neiger et al. ................. 361/42 |
| 5,999,384 | A | * | 12/1999 | Chen et al. ................. 361/106 |
| 6,111,733 | A | | 8/2000 | Neiger et al. ................. 361/42 |

* cited by examiner

*Primary Examiner*—Ronald W. Leja
(74) *Attorney, Agent, or Firm*—Christa Hildebrand; Norris McLaughlin & Marcus P.A.

(57) ABSTRACT

An electrical safety outlet for accepting a plug to provide power to electrical appliances including a power supply and an intelligent circuitry for controlling the power supply to the electrical outlet; the intelligent circuitry includes circuits for determining temperature condition in the outlet, mechanical plug insertion into the outlet, load presence on the outlet, and current capacity conditions.

36 Claims, 6 Drawing Sheets

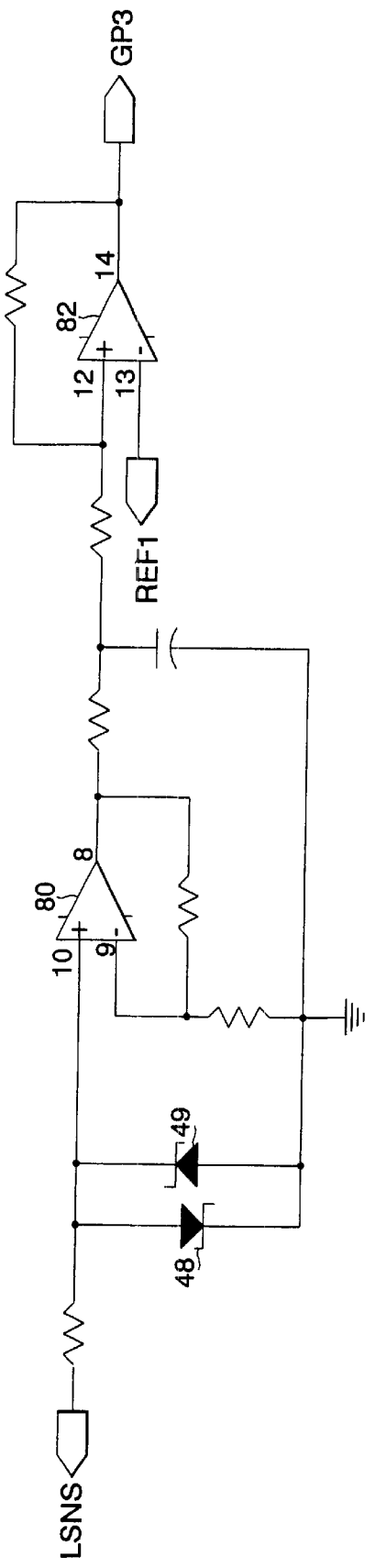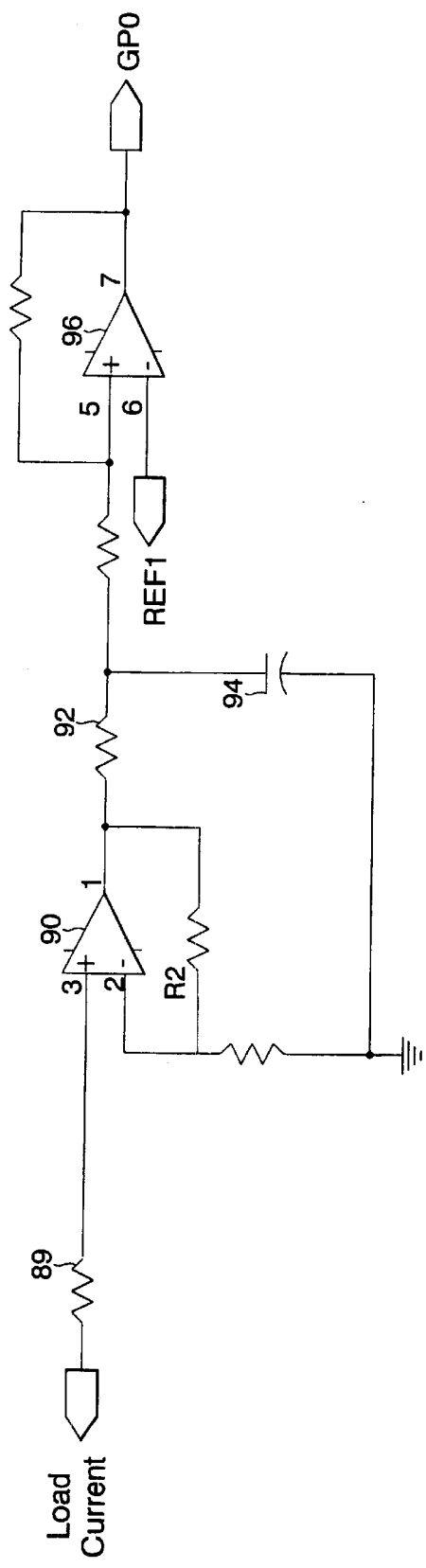
Figure 7
Figure 8

SAFETY ELECTRICAL OUTLET WITH LOGIC CONTROL CIRCUIT

BACKGROUND OF THE INVENTION

1. Field of the Invention

The present invention relates to a logic control device that can be integrated into any double or single household or commercial electrical outlet. It controls the outlet and transforms it into a safe and "smart" outlet. The device can also be integrated into an extension cord, adapter or placed over an outlet as a cover plate. The logic circuit in the smart outlet instantly senses the state and condition of itself and the physical and electrical changes that occur.

2. Description of the Related Art

Every year thousands of people are killed or injured by accidents and fires caused by faulty electrical devices or appliances causing electrical shock. Many protective devices are being implemented to protect young children from accidentally accessing an electrical outlet, causing injuries due to electrical shock. Modern appliances that are more prone to cause accidents are equipped with ground fault protection. Such ground fault circuitry interrupters either interrupt the power until the electric circuit is restored to normal, for example, by manually resetting an electromechanical breaker. Some circuits automatically power-up when normal power resumes. Conveniently, such ground fault circuit interrupters are wired, for example directly into the tool, device or appliance, or it is molded into the cord designated for the tool or device line. Ground fault interrupters are developed to sense minute imbalances in a circuit by current leakage to ground.

Standard electrical built-in outlets either in the home or in an industrial setting, may be also equipped with a ground fault circuit interrupter, a GFCI. Such GFCI devices provide a test and reset function which both work together so that a tripped GFCI cannot be reset if the GFCI circuit no longer provides ground fault protection. The test button can still be operated in the event of an open neutral condition even though the GFCI circuit is no longer powered. A built-in line load reversal feature also prevents the GFCI from resetting if the load and the conditions are mistakenly reversed. The GFCI receptacle face will be live, but there will be no power delivered to devices downstream, indicating a load reversal.

An intelligent circuit interrupt system is disclosed, for example, in U.S. Pat. No. 6,111,733 in which an intelligent circuit is electrically connected between an AC source and a load for interrupting a flow of AC from the source to the load upon detection of an interrupt condition. A circuit interrupter electrically connected to phase and neutral terminals of the AC source defines the interrupt condition. A relay switch with a relay coil and phase and neutral contacts is included such that line and load ends of the phase contact are electrically connected, respectively, between the interrupt means load side phase port and a phase terminal of the load. Line and load ends of the neutral contact are electrically connected, respectively, between the interrupt neutral port and a neutral terminal of the load. The relay coil is electrically coupled between load sides of said phase and neutral contacts for controlling the contacts in response to the interrupt signal. An open-contact miswiring detector (OCMD) is electrically connected to one of the phase and neutral contacts for detecting a miswiring condition when the contacts are in an open state, and a closed-contact miswiring detector (CCMD) is electrically connected to the OCMD and to one of the neutral and phase contacts for detecting a miswiring condition when the contacts are in a closed state. A timing signal generator generates system timing signals. A test circuit electrically coupled to the interrupt means and the timing signal generator tests the interrupt means operability. An alarm circuit is electrically responsive to the test circuit, the timing signal generator, the OCMD and the CCMD for communicating an open-contact miswiring condition, a closed-contact miswiring condition, an operational failure condition, and a need for external testing condition. A power supply is electrically connected between the load ends of the phase and neutral contacts, and to the timing signal generator.

Thus, there is continuous need for an electrical outlet having additional safety features to protect against hazards inherent with standard outlets, such as fire hazards due to overheating, insertion of improper objects into the outlet and current overload. In addition, there is a need to provide an outlet which is capable of detecting whether a load is present.

SUMMARY OF THE INVENTION

It is an object of the present invention to provide an outlet connected to an intelligent circuit, making the outlet a logically controlled device. The intelligent circuit is mounted inside or alongside a standard electrical code-approved outlet box, such that the outlet itself can be installed in the same or similar manner as any outlet is installed. The outlet with the intelligent circuit is preferably a wall mount single or double outlet box and creates thereby a "smart outlet." Thus, existing industry standard outlet-related functions are maintained. The smart outlet does not alter normal operation of any appliance or device, and does not change or modify the normal flow of electricity or any of its characteristic. It operates at the rated voltage, amperage and frequency, for example, at 120Vac and 10Amp for residential use, or at 240Vac, 15 Amp for commercial use, either at 50 or 60 Hz. The smart outlet of the present invention allows normal operation of any device or appliance plugged to the outlet directly or through an extension cord. It can be used with any standard on/off, a remote control unit or any other switching device.

Generally, power supplies from household or industrial outlets deliver power as soon as the device or appliance is plugged in or, power is always present and uninterrupted at the outlet, power or extension cord and appliance or device, except for an interruption within or at this device, yet in general all devices and appliances remain fully or partially powered, in particular power and extension cords. When a smart outlet is used and the electrical plug of an electrical device or appliance is properly inserted, the device is initially always turned off. The logic circuit will sense this condition and the power will remain off, i.e., the smart outlet will not provide any power to the device or appliance. Only when the power switch of the device or appliance is turned on and the circuit is electrically completed, can the device or the appliance draw power and operate. Thus, if a bulb in a lamp is unscrewed while the lamp switch is on, one may touch the contacts inside the socket and not experience an electrical shock. The smart outlet is designed such that it will shut off the power, when the circuit is interrupted (for example, the bulb is unscrewed or has burned out). The power will remain off until the electrical circuit is re-established, and the electrical device or appliance is turned on again.

Thus, only a properly operating electrical device or appliance may be powered up with the device of the present invention. If the electrical circuit is interrupted or overloaded, a fault is detected and the logic circuit of the smart outlet shuts the power to the connected device or appliance off.

The smart outlet is designed to continually monitors any or all of the designed functions, such as it monitors proper and full plug insertion, load presence, current load on the outlet and it senses the outlet temperature.

Accordingly, it is an important object of this invention to monitor whether the blades of the plug are fully and correctly inserted into the slotted openings of the socket, before the outlet provides power. This aspect is of particular importance to promote child safety, because children are known to be attracted to inserting a variety of foreign objects such as bobby pins, metal nails or needles, which may cause disastrous injuries to children. Thus, the smart outlet monitors the acceptance of a properly and fully (completely) inserted plug with standard, acceptable prongs, in good mechanical conditions.

In one embodiment, it is contemplated to utilize a radiation source, such as a light source, for example, an LED, which is positioned inside the socket assembly and within a light conducting means. For example, the light conducting means channel may extend through the outlet perpendicularly to the slotted plug openings for the outlet contacts. At each end of the light conducting channel, a photo sensor is positioned. The photo sensors may be cadmium-sulphide photo cells, photo diodes or photo transistors. When the blades of the plug are fully inserted into the slotted openings of the socket, the blades interrupt the radiation stream in the radiation conducting channels and the illumination of the photo sensors is interrupted. The photo sensors are connected to a logic circuit that controls power to the outlet. While radiation, or specifically, light is emitted from the radiation source, specifically, the diodes, impinges on the photo sensors, no power is provided to the outlet contacts. Preferably, the circuitry includes logic means, such as an "AND" gate and/or appropriate software in a micro controller to sense that both photosensor are simultaneously substantially light blocked or un-illuminated which indicates a correct insertion. This insures that both blades are fully inserted into the outlet contacts. When both photo sensors are simultaneously blocked, the software will permit a relay in the circuit to close. Power can only reach the outlet contacts when the relay is closed. Thus, a broken plug, or a single wire, clip or other invalid object will not cause electric power to be applied to the outlet.

It can easily be appreciated that the invention also contemplates to utilize as a radiation source a non-visible light LED i.e., ultra-violet radiation.

It is yet another object of the present invention to provide a current overload sensor. This feature addresses the problems of overloading outlets with too many appliances or devices, which causes overheating and potential fire. The load current is measured by the voltage drop across a resistor positioned in the current path. This voltage drop is then amplified by a gain block, typically an op amp, integrated by a network, and then tested for magnitude by a comparator. If a current overload occurs, the output of the comparator will go high, thus signaling that event to the micro controller. This will engage a software routine to turn off a relay, and thus removing the line voltage from the socket. An indicator light will be turned on at this point, such as a red LED, showing that an overload has occurred.

Another aspect of the invention is to provide sensing the load presence and current load on the outlet. The monitoring of the load presence makes it possible to only allow power to be present when a load is drawing a specified minimum amount of current. That is, a device or appliance which is turned off, will not draw current and thus, no voltage will be applied. This will also eliminate a major cause for electric shocks. The invention makes it possible to detect even a very small load, such as the load of an electric clock which draws only a few milliamperes. This feature is also particularly important as a child safety feature, because, as discussed above in conjunction with the monitoring of proper plug insertion, a child might insert a proper plug, having cut, open or raw wires extending from the plug, that is, the plug is not attached to any device. In such instance, the circuitry will not allow power to go to the outlet and, thus, the plug will not be under power.

Further, the invention provides for monitoring the temperature in the outlet. Changes in the temperature are observed. If the temperature deviates or exceeds a safe operating temperature, no power is provided to the outlet. This feature alone eliminates one of the major causes of electrical fires, since overheating of electrical outlets is one of a major fire hazards. Overheating is often caused by a defective plug, that is, a plug which is either physically damaged, rusty, or corroded. Rust, corrosion or dirt on the plug blades causes a high electrical resistance to exist between the blades of the plug and the outlet contacts. This high resistance causes a power loss and will raise the temperature of the outlet structure. Ultimately, the combustion temperature of the wall material or the insulation on the wiring may be reached, and a fire will occur. In order to prevent such overheating, the present invention provides a temperature sensing means which interrupts the power supply to the device or appliance if the sensed temperature raises above a set temperature. Good electrical practice dictates that the outlet temperature should not rise higher than about 70° C. to 80° C., depending on the local code. However, this threshold can be set for any code mandated, or safe operating temperature.

One embodiment for monitoring the outlet temperature utilizes a thermistor, but any other device for sensing temperature may be used. The thermistor is preferably placed in close physical contact with the plastic body of the outlet structure, so that the thermistor temperature is approximately equal to the outlet temperature. The electrical resistance of a thermistor varies inversely as a function of its temperature. By means of well known electronic circuitry, preferably a comparator or a Schmitt trigger, the electrical resistance of the thermistor and hence its temperature, can be compared with an accurate internal reference.

Only when each or all monitoring results are satisfactory, the outlet provides power to the appliances or devices connected to the outlet, either directly of via an extension cord. All monitoring is continuous, regardless of the appliance's state, and can work with almost any electrical appliance, device, machine or electrical motor.

It is also an object of the invention to provide an outlet connected to an intelligent circuit as discussed above, in which the outlet also provides all functions of a ground fault interrupter.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 7 illustrates a circuitry for monitoring of load presence.

FIG. 8 illustrates a current load circuitry;

DETAILED DESCRIPTION OF THE PRESENTLY PREFERRED EMBODIMENTS

Figure 1:
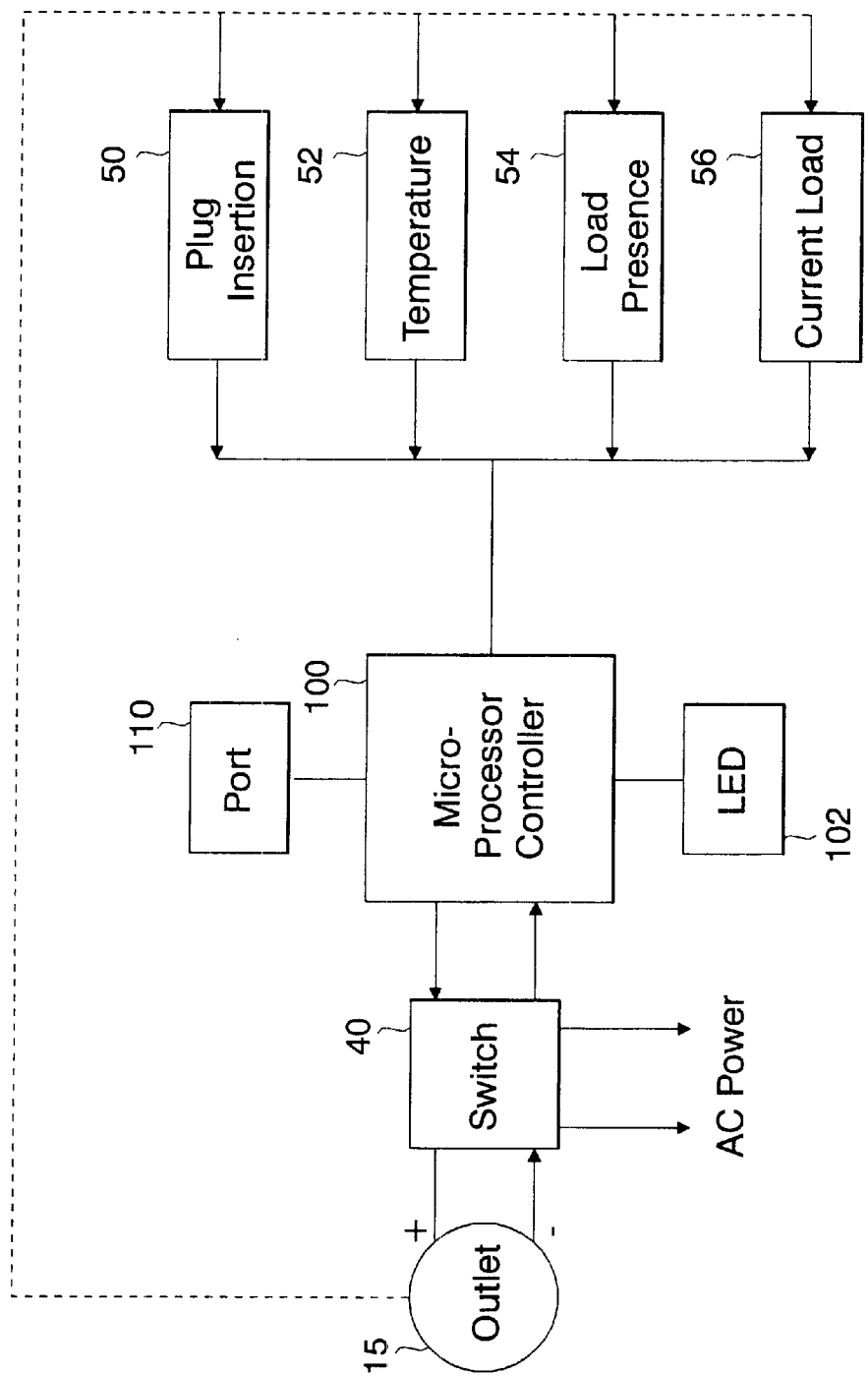
FIG. 1 illustrates an overall block diagram of the invention.
Figure 2:
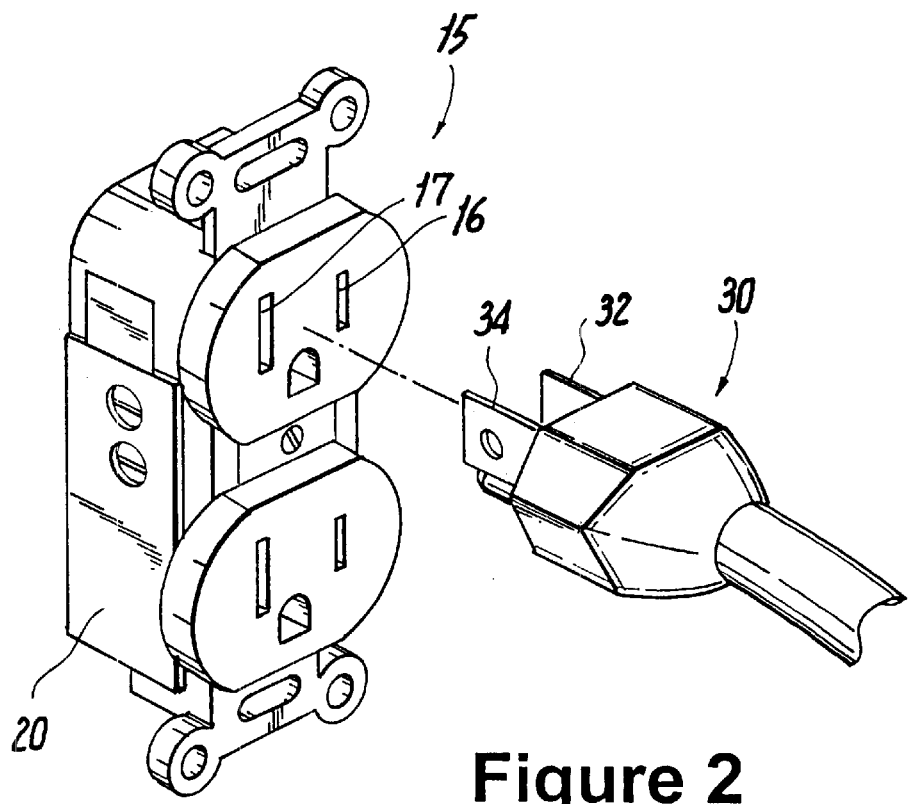
FIG. 2 illustrates a wall outlet and a plug, the wall outlet includes a board containing the logic circuit according to the invention.

FIG. 1 illustrates an overall block diagram of the invention. The wall outlet 15 represents a standard wall mounted outlet and may be a dual outlet, as shown in FIG. 2. The outlet may include all functions of a ground fault interrupter, as is known in the prior art and which is not further described here. Physically associated with the wall outlet 15 is a board 20, for example a PCB board containing the circuitry for monitoring at least four conditions that need to conform in order for the outlet to provide power to any connected device or apparatus. The four monitored functions are proper plug insertion 50; load presence monitoring 54 and current load monitoring 56, as well as temperature sensing 52 in the outlet. Signals inputs from these four sensing or monitoring circuits are analyzed by the micro processor 100 which in turn triggers an electrically controlled switch 40, such as a relay, to provide or not provide power to the outlet 15. The inputs of signals from these four sensing or monitoring circuits are analyzed by the micro processor 100, which in turn triggers the electrically controlled switch, relay 40, to provide or not provide power to the outlet 15. The microprocessor may also support an I/O port 110 for remote control addressing devices, such as computers and real time monitoring, networks or Internet. Accordingly, the electrically controlled switch may be triggered remotely, for example, in the event of a fire, not caused by electrical overheating of the circuit, the outlet may be turned off from a remote device. It is understood that the data for remote control have to be in digital format.

FIG. 2 illustrates a wall outlet 15 and a plug 30 with blades 32 and 34. The wall outlet 15 includes a board 20 containing the logic circuit according to the invention and two plug insertion openings 16 and 17 to receive the blades 32 and 34 from the plug.

Figure 3:
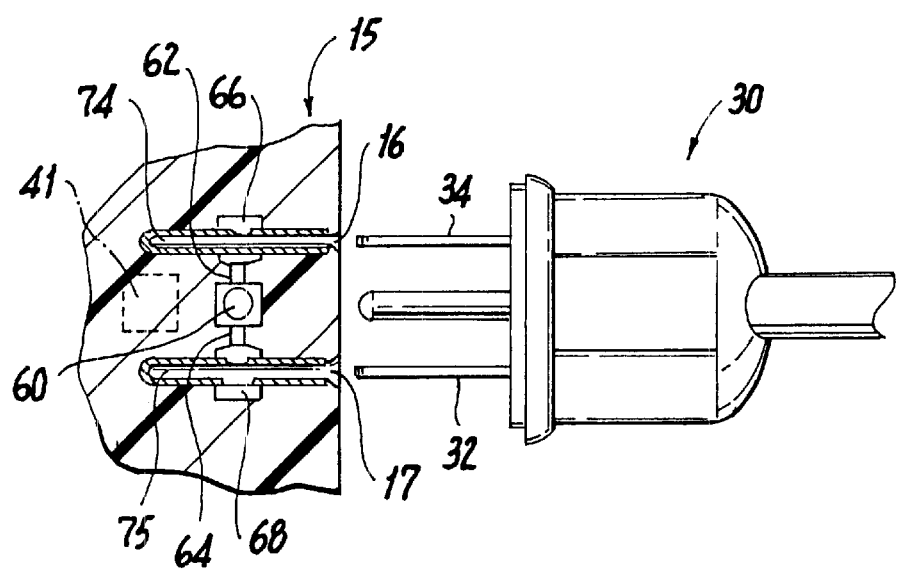
FIG. 3 illustrates an embodiment for temperature sensing and full and proper plug insertion.

FIG. 3 illustrates a top view of the outlet 15 with a temperature sensing and fall and proper plug insertion arrangement. The outlet 15 shows the contact friction apertures 74 and 75 for receiving the blades of plug 30. For example, the radiation source 60 is positioned substantially centrally between the contact friction apertures 74 and 75 and emits radiation which is detected by sensors 66 and 68. The radiation source 60 may be a light source, such as an LED and the sensors 66 and 68 may be photo sensors. The light travels through light channels 62 and 64. The sensors 66 and 68 are located on the outside wall of the contact friction apertures 74 and 75. The friction apertures have an opening adjacent to the sensors, Upon full and proper plug insertion, the channels are blocked off. It is sufficient to only provide one light channel between the radiation source and the sensor, however, it is preferred to monitor both blades for full and proper plug insertion. It can easily be seen that when the plus is inserted, the sensor does not register any radiation, thus, the connected circuit would not provide power to the outlet. However, when the blades 32 and 34 block off the radiations—a condition when the plug is properly and fully inserted, the radiation or light is intermitted and the sensor does not register radiation or light. Consequently, the circuitry is designed to provide power to the outlet. Instead of having a light source and light channels, it is also contemplated to use a radiation source and radiation transmitting rods as 62 and 64, such as fiber optics rods. In such instance, the radiation source may be ultra violet or infrared radiation. Such embodiment will deter potential errors that might occur when sun light would penetrate the plug openings 16 and 17, as well as 74 and 75. Such sunlight night be misread by sensors as light from the light source 60. Obviously, a radiation source 60 need not be on constantly, the circuitry may provide for a pulsating or blinking source.

Figure 6:
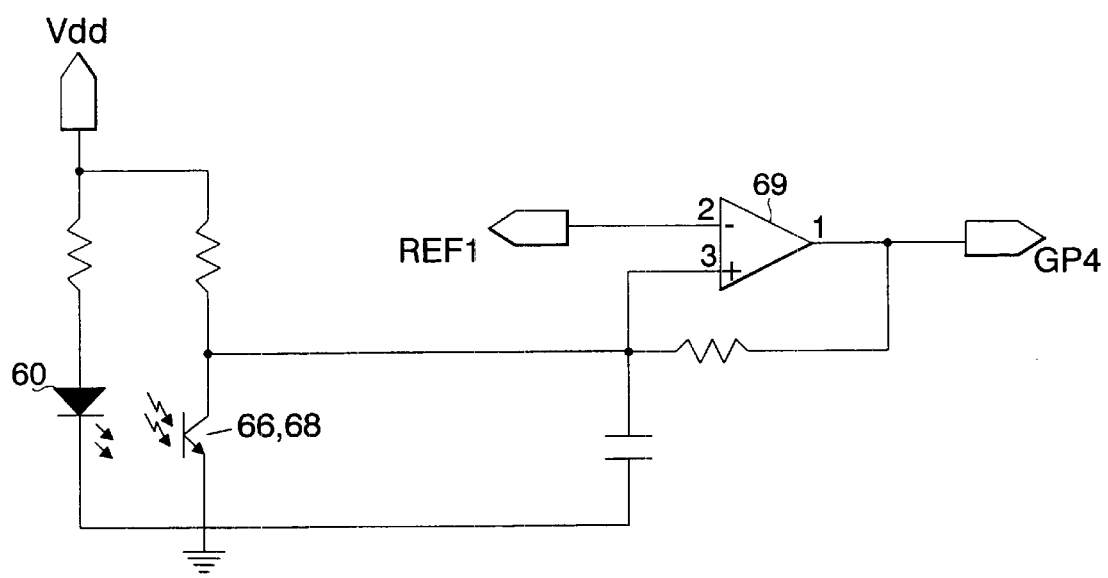
FIG. 6 illustrates the circuitry for testing proper plug insertion.

Thus, in one embodiment, a radiation source 60 is disposes in the wall outlet 15, for example, in the center the outlet plug 15 and the center of two radiation shafts 62 and 64 which are channeling the emitting radiation from the source 60 outward through the channels 62 and 64. The radiation source 60, may be, for example, a light emitting diode. The radiation or light conducting channels 62 and 64 communicate with the light source and conduct the light to photo sensors 66 and 68. The photo sensors 66 and 68 are arranged at both ends of the light conducting channel 64 and 66. The senors 66 and 68 may be cadmium-sulphide photo cells, photo diodes or photo transistors. It can easily be ascertained from FIG. 3, that when the blades 32 and 34 of a plug are fully inserted into the plug insertion openings 16 and 17 of the outlet 15, the continuity of the light 60 through the conducting channels 62 and 64 are broken, and the illumination of the photo sensors 66 or 68 are terminated. As is seen in FIG. 6, each the photo sensor 66 or 68 is connected to a circuitry which determines whether each photo sensor is illuminated. Preferably, logic means, such as an "AND" gate and/or appropriate software in the micro controller is provided to insure that both photo sensors 66 and 68 are simultaneously un-illuminated before sensing a valid plug insertion. Until this condition is fulfilled, the software will not permit relay 40 of FIG. 4 to close. This will insure that a broken plug, a wire, or a paper clip or other invalid object will not allow electric power to be applied to the socket.

Figure 9:
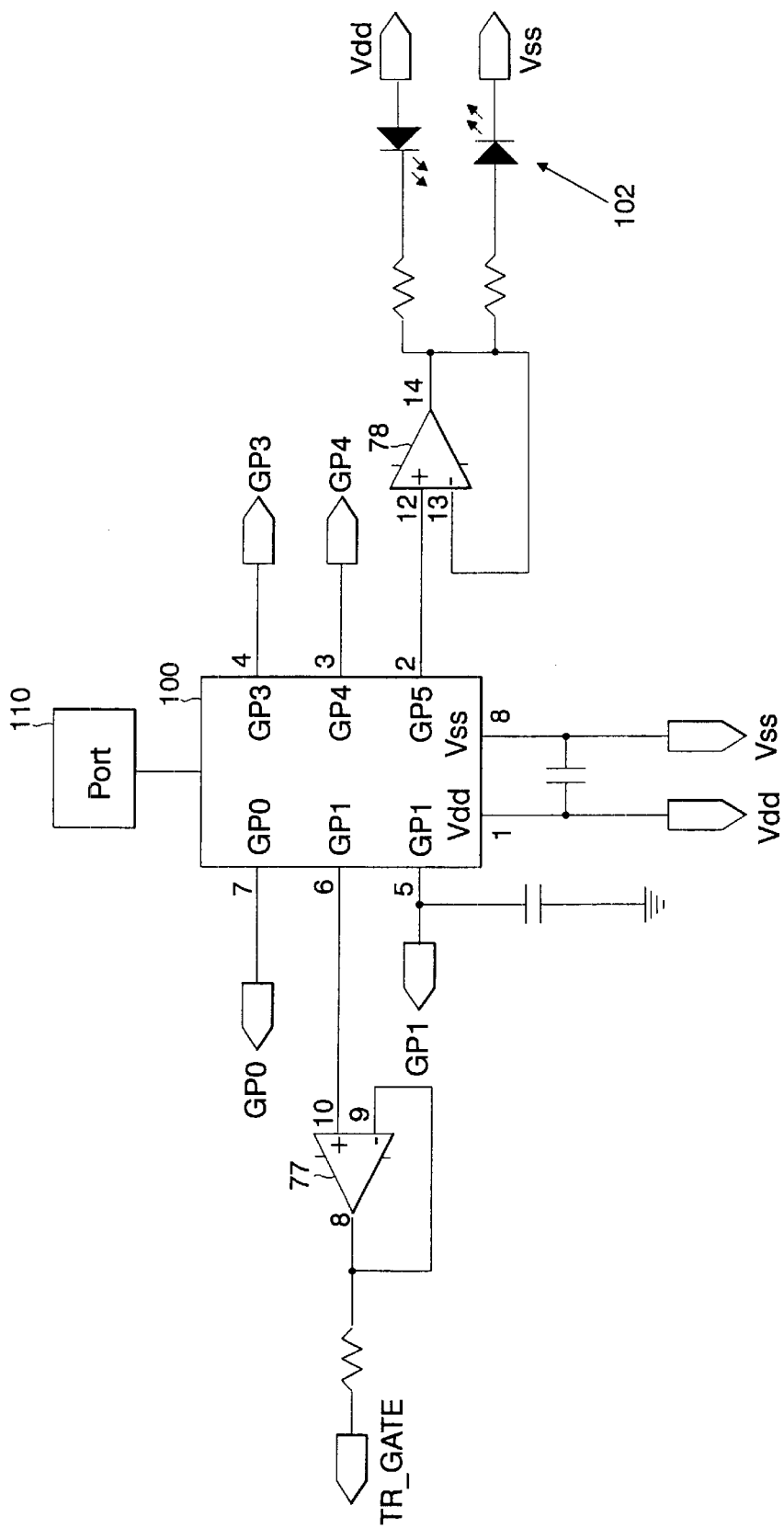
FIG. 9 illustrates the circuitry including a microprocessor and indicator lights.

It should be noted that when the preferred two sensors for monitoring the insertion are utilized, the information provided by each sensor is processed by the micro processor 100, shown in FIG. 9, is processed simultaneously. Further, it is noted that an emitting diode may be used as a radiation source. Any sensors known in the art, appropriate for the radiation source is contemplated, for example, photo sensors, such as cadmium-sulphide photo cells, photo diodes, or photo transistors.

FIG. 3 also shows a temperature sensor 41, such as a thermistor. The thermistor 41 is disposed in the outlet 15, preferably in the center of the outlet 15, so that the thermistor's temperature is approximately equal to the outlet temperature. The temperature sensor, for example, monitors a temperature electrical resistance of a thermistor 41 varies inversely as a function of its temperature. FIG. 5 shows the temperature testing circuit and thermistor 41 and the connection node Vdd, a positive supply voltage for controlling the circuitry (about 5 volts) and the node GP1 as the input/output node to the microprocessor shown in FIG. 9. When the voltage reaches the logic level trip point, a software routine is engaged which will turn off relay 40, shown in FIG. 1 and in detail in FIG. 4. Turning off relay 40 removes power from the socket, and turns on an indicator LED light 102 so that the user can be alerted when the circuitry indicates a fault in the temperature sensing circuit, most likely, when the outlet temperature exceeds its set limit. The LED 102 may also be utilized to indicate a duty cycle by blinking at a high rate.

Figure 4:
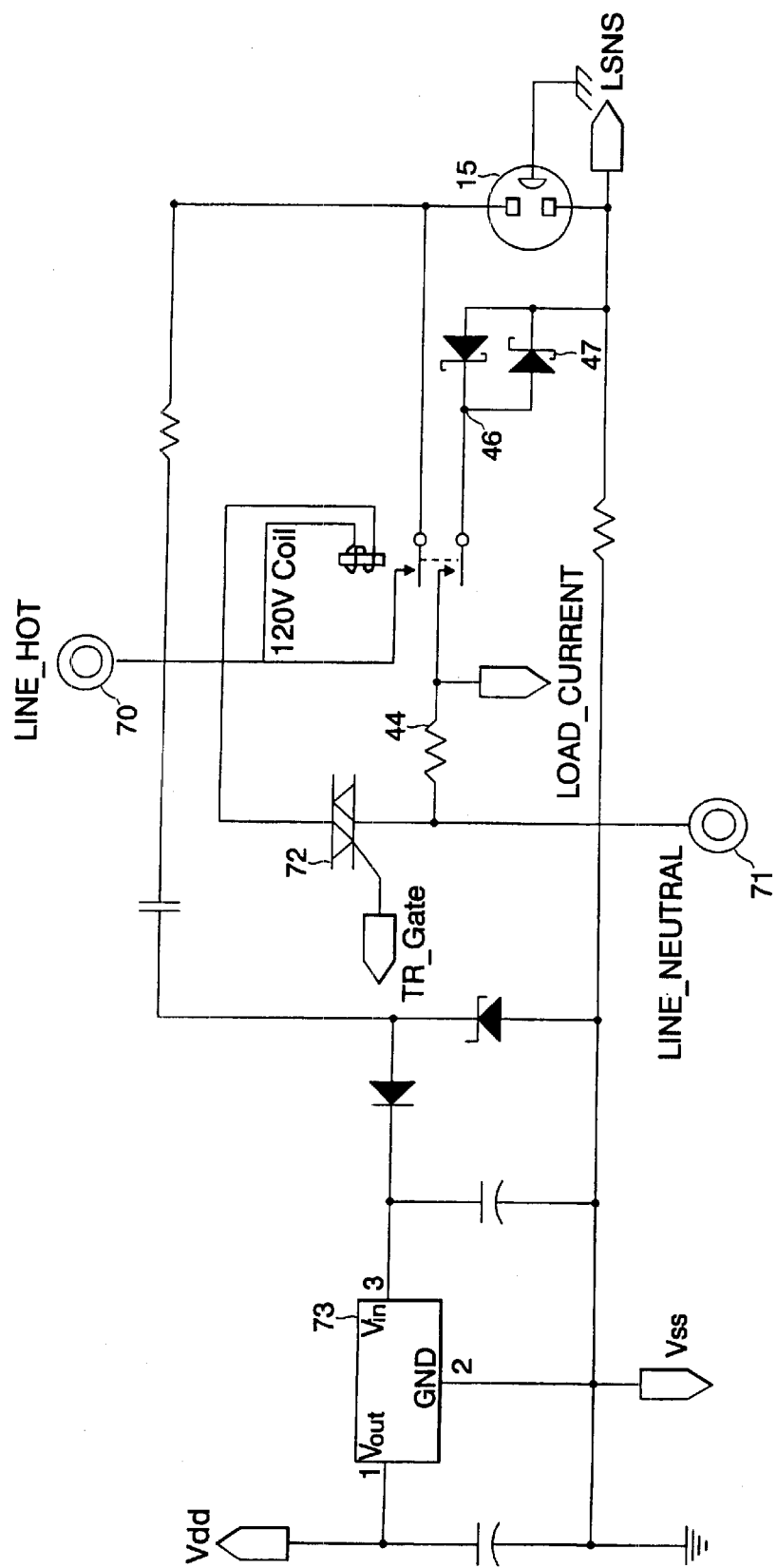
FIG. 4 illustrates a power line interface circuitry.
Figure 5:
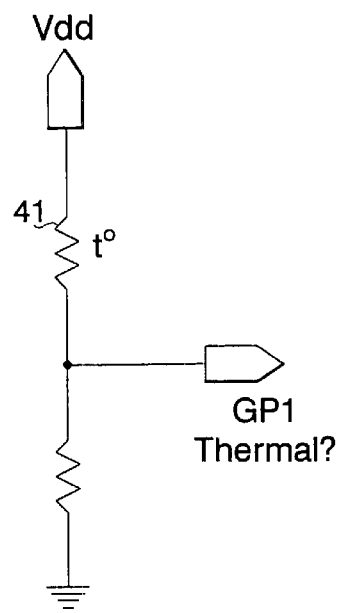
FIG. 5 illustrates a temperature testing circuit.

FIG. 4 illustrates the power line interface circuitry, showing the circuitry between the wall outlet 15 and the power lines 70, 71 and how the circuit related to the other monitoring circuits shown in FIGS. 5–9. The power lines are indicated as 70 (hot) and 71 (neutral). Further, it shows the circuitry connecting the regulator 73, preferably a 5 Volt voltage regulator, connected between the Vdd and the Vss node. It also shows the use of a TR_GATE as a connection point for a triac control electrode (preferably a bi-directional thyristor). A relay 40, also shown in FIG. 1 either provides or not provides power to the outlet 15, depending on the monitored conditions of the functions discussed.

FIG. 6 is the circuitry for testing proper plug insertion, as already discussed int the context of FIG. 3. As is shown, the radiation source 60 provides radiation which is detected by sensors 66 and 68. The signal provided is connected via an Op amp section 69 of a quad op amp package to a node GP4 which is connected to the microprocessor. Positive supply voltage for the control circuit is provides by Vdd; REF 1 indicates a reference voltage node.

FIG. 7 illustrates a circuitry for monitoring the load presence. Node LSNS communicates with the input of amplifier 80, whose output in turn communicates with comparator 82. When a minimum load is detected, the output of comparator 82 will go high and thus signaling that event to micro controller 100. This will engage a software routine, which, after a suitable time delay, preferably about 0.5 second, will close relay 40, and, thus, applying power to the load. Similar to the functions of the Schottky diodes shown in the circuit of FIG. 4, the input of the comparator 82 is protected by Schottky diodes 48 and 49.

FIG. 8 shows a circuitry directed at sensing whether the current load of the outlet has been exceeded. Here, the load current is measured by the voltage drop across a resistor 89 which is inserted into the current path. The voltage drop across the resistor 89 is typically about 100 millivolts at full rated load. This voltage is then amplified by gain block 90 shown, typically an Op amp section of a quad op amp package, and integrated by the resistor/capacitor network 92 and 94 and then tested for magnitude by comparator 96. If a current overload occurs, the output of comparator 96 will go high, thus signaling that event to the micro controller 100 shown in FIG. 9. This will engage a software routine to turn off the relay 40 of FIGS. 1 and 4, thus removing line voltage from the socket. An indicator light 102, as seen in FIG. 9 will turn on at this point, indicating that an overload has occurred.

The circuitry that does not apply power to the outlet unless a load is present that is drawing current. Accordingly, it is within the invention to detect a load which draws only a few milliamperes, for instance the load of an electric clock.

In FIG. 4 there are shown diodes 46 and 47, for example, Schottky diodes, which are connected in parallel with reversed polarity. Node LSNS will be at the same potential as node Vss when no current is drawn from outlet 15 (note relay 40 is open at this time). When a load of some predetermined minimum magnitude is connected to outlet 15, node LSNS will be pulled positive by an amount limited by the forward voltage drop of a Schottky diode, typically 0.4 volts.

FIG. 9 illustrates the circuitry of the microprocessor 100 and indicator lights 102, as also demonstrated in FIG. 1. Accordingly, the four monitored/sensed functions of full and proper plug insertion, load presence, current load and temperature sensing are processed. The inputs of signals from these four sensing or monitoring circuits are analyzed by the micro processor 100, which in turn triggers the electrically controlled switch, relay 40, to provide or not provide power to the outlet 15. However, it should be noted that power is only provided after a brief delay of about 0.5 seconds, allowing the device or appliance connected to the outlet to established a stabilized electric flow. Similarly, when a device connected to the outlet 15 is turned off, a similar lag time is provided, in which the device stays on for about 0.5 minutes.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An electrical safety outlet having contact friction apertures for accepting non-ground blades of a plug to provide power to an electrical appliance, the electrical outlet comprises an electrically controlled switch; and intelligent circuitry for controlling the power flow received from a power source via the electrically controlled switch to the electrical safety outlet, the intelligent circuitry includes a source disposed between the contact friction apertures, and at least one sensor for determining full and proper plug insertion into the outlet, the at least one sensor being disposed so as to receive emissions from the source after passing through only the associated contact friction aperture.

2. The electrical safety outlet according to claim 1, wherein the intelligent circuitry includes a sensor for load presence, a sensor for current load on the outlet and a sensor for temperature in the outlet.

3. The electrical outlet according to claim 2, wherein the intelligent circuitry includes a microprocessor for processing information supplied by the at least one sensor for monitoring full and proper plug insertion, the load presence sensor, the current load sensor and the temperature sensor.

4. The electrical outlet according to claim 3, wherein the electrically controlled switch provides the power supply to the electrical outlet only when the sensed information processed by the microprocessor of the monitored full and proper plug insertion, the load presence, the current load and temperature meets a set standard.

5. The electrical outlet according to claim 4, wherein the electrically controlled switch is connected to the electrical outlet and the microprocessor.

6. The electrical outlet according to claim 5, wherein the intelligent circuitry is provided on a PCB board, and disposed on the electrical outlet.

7. The electrical outlet according to claim 6, wherein the temperature sensor is a thermistor having a change in resistance upon a change in the temperature.

8. The electrical outlet according to claim 7, wherein the microprocessor includes a Schmitt trigger and wherein the change in resistance is compared by the Schmitt trigger to a reference temperature and, depending on the results of the comparison, the microprocessor, via the electrically controlled switch, effects the power supply to the outlet.

9. The electrical outlet according to claim 4, wherein the source is a light source emitting light into at least one channel positioned substantially transverse to at least one of the contact friction apertures such that upon proper and fill insertion, the light is intermitted.

10. The electrical outlet according to claim 9, wherein the source is a light source and the at least one sensor for monitoring proper and fill plug insertion are two sensor, two channels connect the light source to the respective contact fiction apertures, the two sensors being disposed in the outlet proximate the respective contact friction apertures opposite their associated channels.

11. The electrical outlet according to claim 10, wherein the information provided to the microprocessor by the sensors for monitoring fill and proper plug insertion, the load presence sensor, the current load sensor and the temperature sensor is processed instantaneously.

12. The electrical outlet according to claim 10, wherein the information provided to the microprocessor by each sensor for monitoring fill and proper plug insertion is processed simultaneously.

13. The electrical outlet according to claim 12, wherein the sensors for monitoring proper and full plug insertion are photo sensors.

14. The electrical outlet according to claim 13, wherein the photo sensors are cadmium-sulphide photo cell.

15. The electrical outlet according to claim 12, wherein the sensors for monitoring proper and full plug insertion are photo diodes.

16. The electrical outlet according to claim 12, wherein the sensors for monitoring proper and fill plug insertion are photo transistors.

17. The electrical outlet according to claim 9, wherein the light source is a light emitting diode.

18. The electrical outlet in accordance with claim 1, wherein the source is a radiation source, radiation emitted from the radiation source is transmitted to at least one of the contact friction apertures through radiation transmitting material.

19. The electrical outlet according to claim 18, wherein the radiation transmitting material is fiber optics.

20. The electrical outlet according to claim 18, wherein the at least one sensor for monitoring proper and full plug insertion are two sensors, radiation emitted from the radiation source is transmitted to each contact friction aperture through radiation transmitting material, the two sensors being disposed in the outlet proximate the respective contact friction apertures to receive the emitted radiation after passing through an associated contact friction aperture.

21. An electrical safety outlet having contact friction apertures for accepting non-ground blades of a plug to provide power to an electrical appliance, the electrical outlet comprises
an electrically controlled switch;
intelligent circuitry for controlling power supply received from a power source via the electrically controlled switch to the electrical outlet, the intelligent circuitry includes a source disposed between the contact friction apertures, and at least one sensor for monitoring proper and full plug insertion, the at least one sensor being disposed so as to receive emissions from the source after passing through only the associated contact friction aperture, the intelligent circuitry further including a sensor for load presence, a sensor for current load on the outlet and a sensor for temperature in the outlet.

22. The electrical outlet according to claim 21, wherein the source is a light source and at least one sensor for monitoring proper and full plug insertion are two sensors, two channels connect the light source to the respective contact friction apertures, the two sensors being disposed in the outlet proximate the respective contact friction apertures opposite their associated channels.

23. The electrical outlet in accordance with claim 21, wherein the source is a radiation source, radiation emitted from the radiation source is transmitted to at least one of the contact friction apertures through radiation transmitting material.

24. The electrical outlet according to claim 23, wherein the radiation transmitting material is fiber optics.

25. The electrical outlet according to claim 23, wherein the at least one sensor for monitoring proper and full plug insertion are two sensors, radiation emitted from the radiation source is transmitted to each contact friction aperture through radiation transmitting material, the two sensors being disposed in the outlet proximate the respective contact friction apertures to receive the emitted radiation after passing through an associated contact fiction aperture.

26. An electrical safety outlet having contact friction apertures for accepting non-ground blades of a plug to provide power to an electrical appliance, the electrical outlet comprises
an electrically controlled switch;
intelligent circuitry for controlling power supply received from a power source via the electrically controlled switch to the electrical outlet, the intelligent circuitry includes a source disposed between the contact friction apertures and at least one sensor for monitoring proper and full plug insertion, the at least one sensor being disposed so as to receive emissions from the source after passing through only the associated contact friction aperture, the intelligent circuitry further including a sensor for load presence, a sensor for current load on the outlet and a sensor for temperature in the outlet; and
wherein the intelligent circuitry includes a microprocessor which includes an I/O port for remote addressing.

27. The electrical outlet according to claim 26, wherein the source is a light source and at least one sensor for monitoring proper and full plug insertion are two sensors, two channels connect the light source to the respective contact friction apertures, the two sensors being disposed in the outlet proximate the respective contact friction apertures opposite their associated channels.

28. The electrical outlet according to claim 26, wherein the source is a radiation source, radiation emitted from the radiation source is transmitted to at least one of the contact friction apertures through radiation transmitting material.

29. The electrical outlet according to claim 28, wherein the radiation transmitting material is fiber optics.

30. The electrical outlet according to claim 28, wherein the at least one sensor for monitoring proper and full plug insertion are two sensors, radiation emitted from the radiation source is transmitted to each contact friction aperture through radiation transmitting material, the two sensors being disposed in the outlet proximate the respective contact friction apertures to receive the emitted radiation after passing trough an associated contact friction aperture.

31. A method for operating an electrical safety outlet having contact friction apertures for accepting non-ground blades of a plug to provide power to an electrical device, the outlet including an electrically controlled switch, the method comprising the step of controlling the power flow from a power source via the electrically controlled switch to the electrical outlet based on the detection of full and proper plug detection using intelligent circuitry, the intelligent circuitry including a source disposed between the contact friction apertures and at least one sensor for determining full and proper plug insertion into the outlet, the at least one sensor being disposed so as to receive emissions from the source after passing through only the associated contact friction aperture.

32. The method according to claim 31, wherein the controlling step further comprises controlling the power flow from the power source via the electrically controlled switch to the electrical outlet based on the detection of load presence, current load and temperature in the outlet using the intelligent circuitry.

33. The method according to claim 31, wherein the source is a light source and at least one sensor for monitoring proper and full plug insertion are two sensors, two channels connect the light source to the respective contact friction apertures, the two sensors being disposed in the outlet proximate the respective contact friction apertures opposite their associated channels.

34. The method according to claim 31, wherein the source is a radiation source, radiation emitted from the radiation source is transmitted to at least one of the contact friction apertures through radiation transmitting material.

35. The method according to claim 34, wherein the radiation transmitting material is fiber optics.

36. The method according to claim 34, wherein the at least one sensor for monitoring proper and full plug insertion are two sensors, radiation emitted from the radiation source is transmitted to each contact friction aperture through radiation transmitting material, the two sensors being disposed in the outlet proximate the respective contact friction apertures to receive the emitted radiation after passing through an associated contact friction aperture.

* * * * *

UNITED STATES PATENT AND TRADEMARK OFFICE
CERTIFICATE OF CORRECTION

PATENT NO.      : 6,552,888 B2                                           Page 1 of 1
DATED           : April 22, 2003
INVENTOR(S)     : Pedro J. Weinberger It is certified that error appears in the above-identified patent and that said Letters Patent is hereby corrected as shown below:

<u>Title page,</u>
Item [75], Inventors, the Inventor's address which reads "14 Horatio St., #3H, New York, NY (US) 10014" should read -- 302-A $12^{th}$ Street, #106, New York, NY (US) 10014 --.

<u>Column 9,</u>
Lines 22, 26, 33, 38 and 49, "fill", each occurrence should read -- full --.

Signed and Sealed this

Eighteenth Day of November, 2003

JAMES E. ROGAN
*Director of the United States Patent and Trademark Office*